United States Patent

Crawley

[11] Patent Number: 5,085,001
[45] Date of Patent: Feb. 4, 1992

[54] STABILIZED MULCH SKIRT

[76] Inventor: Michael S. Crawley, 704 Lakehurst Dr., Shelby, N.C. 28150

[21] Appl. No.: 522,918

[22] Filed: May 14, 1990

[51] Int. Cl.$^5$ .................................................. A01G 17/00
[52] U.S. Cl. .......................................... 47/25; 47/32
[58] Field of Search ................................ 47/25, 32, 26

[56] References Cited

U.S. PATENT DOCUMENTS

| | | | |
|---|---|---|---|
| 1,453,810 | 5/1923 | Sleen | 47/32 X |
| 3,305,969 | 2/1967 | Mattson | 47/25 |
| 3,571,972 | 3/1971 | Carter, Jr. | 47/32 X |
| 3,727,347 | 4/1973 | Barnes | 42/32 |
| 3,857,195 | 12/1974 | Johnson | 47/32 |
| 4,858,378 | 8/1989 | Helmy | 47/25 |

FOREIGN PATENT DOCUMENTS

3504112  8/1986  Fed. Rep. of Germany .

*Primary Examiner*—David A. Scherbel
*Assistant Examiner*—Linda J. Watson
*Attorney, Agent, or Firm*—Clifton Ted Hunt

[57] ABSTRACT

A mulch skirt for inhibiting the growth of vegetation around a tree or post is formed from a single sheet having an initial axial opening and a slit extending from the axial opening to a point on the periphery of the skirt. A plurality of adjustment strips are formed around the axial opening by successive concentric rows of serrations. The mulch skirt can be custom-sized on the site to fit around a selected tree or post by removing an inner portion of the mulch skirt along a selected row of serrations corresponding in diameter to the base diameter of the tree or post with which the mulch skirt is to be used. The mulch skirt may be stabilized by a ring extending around the periphery of the skirt and by anchor pins fastening the ring to the ground.

4 Claims, 1 Drawing Sheet

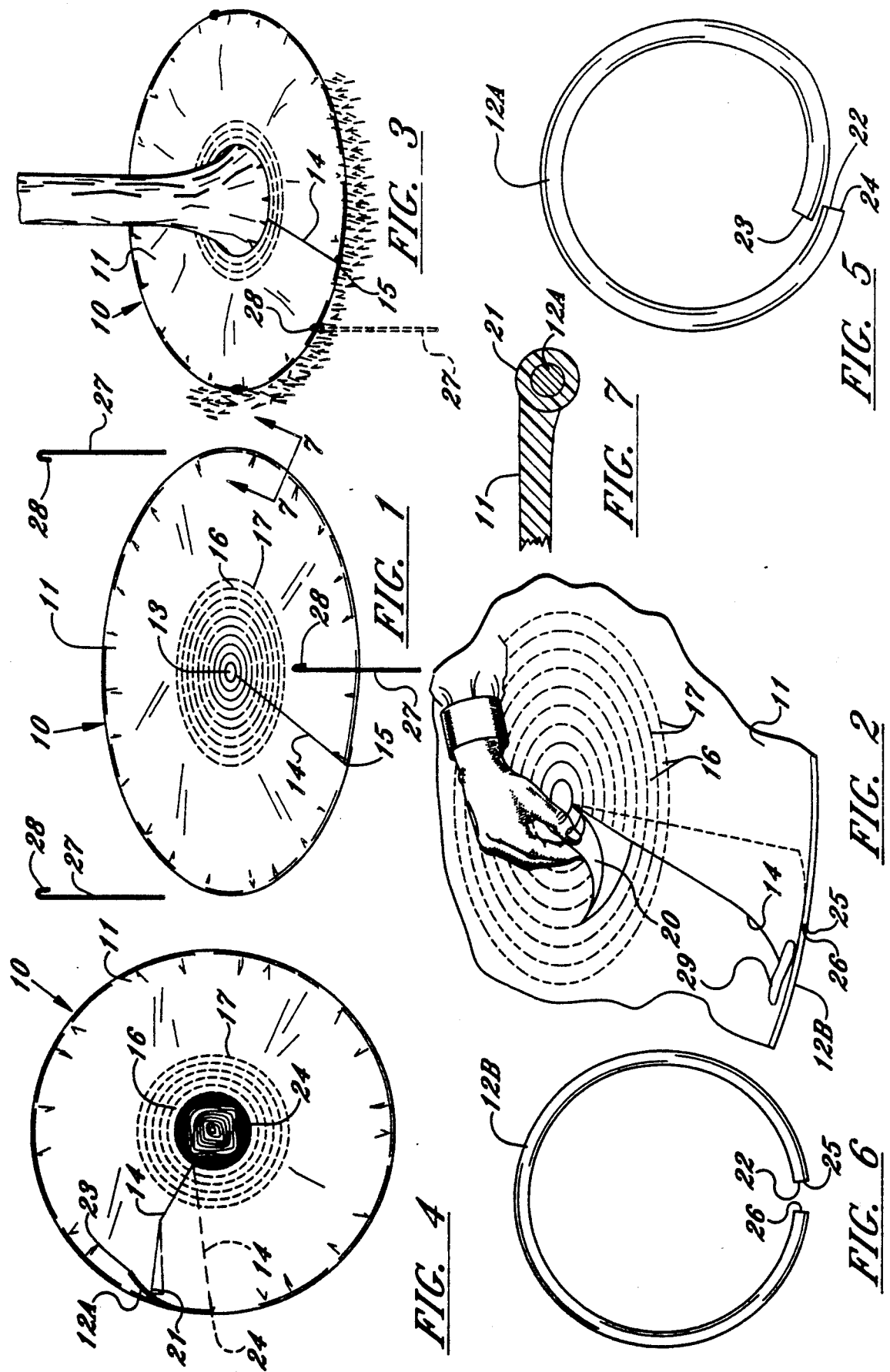

STABILIZED MULCH SKIRT

FIELD OF THE INVENTION

This invention relates to the protection of trees and the inhibition or prevention of vegetation growth around the bases of trees and posts.

BACKGROUND OF THE INVENTION

Devices are known in the prior art for inhibiting the growth of vegetation about the bases of trees and posts, and for protecting trees. See, for example, the following patents:

| U.S. Pat. No. | ISSUE DATE | INVENTOR | TITLE |
|---|---|---|---|
| 1,130,546 | Mar 2, 1915 | Scott | TREE PROTECTION |
| 1,235,520 | July 31, 1917 | Kirfman | TREE PROTECTING DEVICE |
| 2,949,698 | Aug 23, 1960 | Downey | RESILIENT PERMANENT MULCH PAD |
| 3,571,972 | Mar 23, 1971 | Carter | PROTECTIVE GROUND COLLAR |

The Kirfman tree protector is apparently made of metal and is relatively expensive to manufacture and troublesome to install about a tree. The Downey mulch pad is made from inorganic glass and mineral wool fibers of the type used for insulation material in refrigerators, ovens, and the like, and is also relatively expensive to manufacture. The Scott tree protector is made from tarpaper, tarred burlap, or felt. Neither Scott, Downey, or Kirfman provide adjustment in size for a growing tree or to enable the protector to be installed about different sizes of trees. Each protector was apparently custom-made for a specific tree.

The Carter protective ground collar is made from felt impregnated with polyurethane resin. Carter's ground collar includes three separate sheets. The inner one is an adjustable portion that fits snugly around a tree and expands outwardly as the tree grows, but the assembling of the three sheets about a tree is unduly troublesome and time consuming.

SUMMARY OF THE INVENTION

It is an object of the present invention to provide a device which will effectively inhibit the growth of ground cover, such as weeds and grass, around the base of a tree or post.

Another object of the invention is to provide a mulch skirt of the type described which is inexpensive to manufacture.

It is still another object of this invention to provide a mulch skirt of the type described which includes adjustable means enabling it to be fitted snugly about trees and posts of different diameters.

It is a further object of the invention to provide a mulch skirt of the type described which may be quickly assembled and easily installed in operative position about a tree or post.

It is a more specific object of the invention to provide a mulch skirt of the type described which comprises a flexible sheet having an axial opening and a radial slit extending between the axial opening and a point on the periphery of the sheet. The flexible sheet has concentric circular rows of serrations spaced radially outwardly from the axial opening and spaced about half an inch from each other. In use, the flexible sheet of the mulch skirt is torn along a circular row of serrations corresponding to the cross-sectional dimensions of the tree or post to be fitted and to enlarge the axial opening accordingly. The radial slit defines radial edges which may be spread apart when positioning the mulch skirt around a tree or post, and which overlap when the mulch skirt is in operative position. The flexible sheet is stabilized by a metal or plastic ring extending through a cicumferential hem in the sheet with free ends at the radial edges of the sheet. Anchor pins embedded in the ground hold the ring and the sheet in place.

BRIEF DESCRIPTION OF THE DRAWINGS

FIG. 1 is a perspective view of the mulch skirt;

FIG. 2 is a somewhat schematic view of the mulch skirt, with parts broken away, illustrating the removal of a serrated inner portion of the skirt to accomodate the diameter of a tree;

FIG. 3 is a perspective view similar to FIG. 1 but showing the mulch skirt assembled about a tree after removal of a serrated inner portion to accomodate the tree;

FIG. 4 is a top plan view of the mulch skirt assembled about a post.

FIG. 5 is a plan view of a first embodiment of the stabilizing ring removed from the mulch skirt and showing the stabilizing ring with initially abutting ends which will overlap after the mulch skirt and stabilizing ring are placed about a tree;

FIG. 6 is a plan view of a second embodiment of the stabilizing ring removed from the mulch skirt and showing the stabilizing ring with initially spaced apart ends which will be held in abutting relation after the mulch skirt and stabilizing ring are placed about a tree; and FIG. 7 is a sectional view taken substantially along the line 7—7 in FIG. 1.

DETAILED DESCRIPTION OF THE INVENTION

Referring more specifically to the drawings, the reference numeral 10 broadly indicates a mulch skirt comprising a flexible sheet 11 and a stabilizing rod indicated at 12A and 12B.

The flexible sheet 11 may be made from any suitable material, such as sheet plastic, for example. In the illustrated embodiment, the sheet 11 is illustrated as being circular but may be of any desired configuration. The sheet 11 is formed with an initial small axial opening 13 and a radial slit 14 extending between the axial opening 13 and a point 15 on the periphery of the sheet.

Circular rows of adjustment strips 16 are defined by a plurality of concentric rows of serrations 17 spaced radially from each other with the innermost row of serrations being spaced outwardly from the axial opening 13.

One function of the adjustment strips 16 and concentric rows of serrations 17 is to enable the mulch skirt 10 to be initially conformed to the diameter of a tree T or post P with which the mulch skirt is to be used. This is accomplished, as illustrated in FIGS. 2 and 3, by selecting the circular row of serrations 17 having the diameter most nearly corresponding to the base diameter of the tree to be surrounded by the mulch skirt and tearing the mulch skirt along the selected row of serrations to remove an inner portion 20 (FIG. 2) of the mulch skirt properly sized to accomodate the tree T.

Another function of the adjustment strips 16 and concentric rows of serrations 17 is to enable the opening in the center of the mulch skirt to be enlarged by tearing away successive adjustment strips 16 as the growth of the tree increases the diameter of the base.

The dimensions are not critical but satisfactory results have been achieved in practice with a circular mulch skirt about twenty seven (27) inches in diameter having an axial opening about one inch in diameter, and eleven rows of serrations 15 spaced radially from each other about half an inch to define twelve circular adjustment strips 16, each half an inch wide.

In practice, a mulch skirt this size will fit around trees up to one foot in diameter and extend one foot radially from the tree with three (3) inches of overlap to fully cover the area to be protected. Removal of the grass from around the tree before the mulch skirt is installed enables the mulch skirt to lie against the ground and to thereby effectively prevent the growth of vegetation around the tree.

The flexible sheet 11 of the mulch skirt 10 is held flat against the ground by either of the stabilizing rings 12A or 12B, which may be made from plastic or steel and inserted in a hem 21 around the periphery of the flexible sheet 11. Alternatively, the sheet 11 and the stabilizing rings 12A and 12B may be made from plastic and the stabilizing ring and the sheet may be molded together.

Referring to FIGS. 5 and 6, each of the stabilizing rings 12A and 12B is split as at 22 to define terminal ends 23 and 24 on the stabilizing ring 12A (FIG. 5) and terminal ends 25 and 26 on the stabilizing ring 12B (FIG. 6). The stabilizing rings 12A and 12B are each shown in their relaxed condition in FIGS. 5 and 6. The terminal ends 23 and 24 on the ring 12A overlap each other, as shown in FIG. 5, while the terminal ends 25 and 26 on the ring 12B are spaced from each other.

The split 22 in the rings 12A and 12B coincides with the slit 14 in the sheet 11 so that separation of the terminal ends of a selected stabilizing ring to position the mulch skirt 10 around a tree will cause corresponding separation of the radially slit edges of the sheet 11. When allowed to relax, the terminal ends 23 and 24 of the stabilizing ring 12A overlap each other as shown in FIGS. 5, causing corresponding overlapping of the slit edges of the sheet 11 so that the mulch skirt 10 effectively covers the ground.

The terminal ends 25 and 26 of the stabilizing ring 12B are further separated to position the mulch skirt around a tree or post and are then allowed to relax to their normal separation, shown in FIG. 6. This causes corresponding and undesirable separation of the radially slit edges of the sheet 11, as shown in FIG. 2. A latch mechanism, schematically illustrated at 29, holds together the terminal ends 25 and 26 of the stabilizing ring 12B and the radially slit edges of the sheet 11 after its mulch skirt is operatively positioned about a tree or post.

A group of anchor pins 27 with hooked end portions 28 may fit over the stabilizing ring and be embedded in the ground, as shown in FIG. 3, to provide further stability to the mulch skirt.

Conventional mulch material 24, such as wood chips or pine straw, can be used to fill the space between a rectangular post P and the innermost circular adjustment strip 16 in FIG. 4.

There is thus provided a mulch skirt which will effectively prevent the growth of vegetation around trees and posts, as in the prior art, and which has the novel advantage of being designed for the economies of mass production in such a way that each mulch skirt can be quickly and easily custom-sized on the site to fit around a selected tree or post.

Although specific terms have been employed, they have been used in a generic and descriptive sense only and not for the purpose of limitation.

I claim:

1. A mulch skirt for inhibiting the growth of ground cover such as weed and grass around a tree or post, said mulch skirt comprising a flexible waterproof sheet having an initial axial opening and a slit extending from the opening to a point on the periphery of the sheet and defining slit edge portions, means causing the slit edge portions to overlap in use, a plurality of radially spaced adjustment strips formed around the axial opening by successive concentric rows of serrations, whereby the mulch skirt can be custom-sized on the site to fit around a selected tree or post by removing an inner portion of the mulch skirt along a selelcted row of serrations corresponding in diameter to the base diameter of the tree with which the mulch skiret is to be used, a stabilizing ring extending about the periphery of the flexible sheet, said stabilizing ring being split to define terminal ends which overlap each other in relaxed operative position and wherein the split in the stabilizing ring coincides with the slit in the flexible sheet so that overlapping of the terminal ends of the stabilizing ring causes corresponding overlapping of the slit edge portions of the flexible sheet, and means connecting the stabilizing ring to the flexible sheet to hold it in place.

2. A mulch skirt according to claim 1 wherein anchor pins are provided for attaching the stabilizing ring to the ground.

3. A mulch skirt for inhibiting the growth of ground cover such as weed and grass around a tree or post, said mulch skirt comprising a flexible waterproof sheet having an initial axial opening and a slit extending from the opening to a point on the periphery of the sheet and defining slit edge portions, means causing the slit edge portions to overlap in use, a plurality of radially spaced adjustment strips formed around the axial opening by successive concentric rows of serrations, whereby the mulch skirt can be custom-sized on the site to fit around a selected tree or post by removing an inner portion of the mulch skirt along a selelcted row of serrations corresponding in diameter to the base diameter of the tree with which the mulch skiret is to be used, a stabilizing ring extending about the periphery of the flexible sheet, said stabilizing ring being split to define terminal ends which are spaced from each other in relaxed but inoperative position, means for holding together the terminal ends of the stabilizing ring and the radially slit edges of the flexible sheet in the operative position, and means connecting the stabilizing ring to the flexible sheet to hold it in place.

4. A mulch skirt according to claim 3 wherein anchor pins are provided for attaching the stabilizing ring to the ground.

* * * * *